April 19, 1966  E. P. LINO  3,246,877
WEED PULLER
Filed Dec. 24, 1963

Edward P. Lino
INVENTOR.

BY *Clarence A. O'Brien*
and *Harvey B. Jacobson*
Attorneys

United States Patent Office 3,246,877
Patented Apr. 19, 1966

3,246,877
WEED PULLER
Edward P. Lino, 53841 Kamehameha Highway, Box 121, Hauula, Hawaii
Filed Dec. 24, 1963, Ser. No. 333,126
2 Claims. (Cl. 254—132)

This invention relates to a manually usable implement which is expressly constructed for use when the user is called upon to eradicate deep or shallow rooted weeds from a garden, rose garden for example, lawn or wherever else a weeding job has to be undertaken.

Actual use of the weeding implement herein disclosed has shown that it serves to securely and reliably grip and pull weeds out of the ground without severing the roots. Its use has been practical and acceptable whether used in the garden, yard or grassy lawn. The implement performs reliably and can be easily handled around growing plants even where it has to be angled and the user has to "reach in" between hard-to-reach plants. This manner of use has proved to be satisfactory time and again despite the fact that the plants were known to be delicate and susceptible of easy damage.

In carrying out the invention several improvements are featured. One improvement is predicated on the relatively stationary jaw means; namely, a ground-penetrating jaw which is an integral specially shaped extension at the leading or lower end of the tubular member. A complemental or companion jaw comprises the movable jaw and is the principal component or part (appropriately constructed means) carried by said lower end. This means is novel in that it embodies a pair of arms straddling the tubular member, pivoted thereon and acted on by a return spring and actuated by a stainless steel or an equivalent wire.

It will be evident from the description of the invention thus far given that the general objective is to structurally, functionally and in other ways improve upon similarly constructed and performing prior art cane-type weeders whereby to thus provide an adaptation which not only serves the purposes for which it is intended but is such in construction that it should unquestionably appeal to manufacturers, retailers and users.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
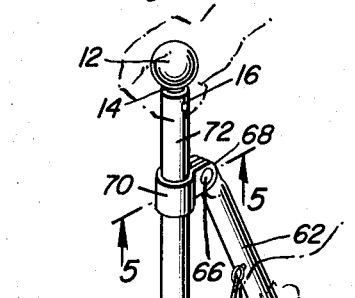
FIGURE 1 is a view in perspective showing a weed pulling implement constructed in accordance with the invention and illustrating the manner in which the ground penetrating blade has been forced into the ground and thus readied to permit the user to catch hold of the operating lever at the top and to lift it upwardly to complete the weed gripping and extracting step.

The elongated tubular member is denoted by the numeral 6 and is three or four feet (more or less) in length. A suitable length of pipe has been used in experimental implements and has been shown to serve the desired reach and handling functions. The lower or leading end of this member is constructed to provide a spoon-like blade or jaw 8 whose extremity is reduced in size to provide a ground penetrating lip 10. For convenience of description this blade is preferably identified as a relatively stationary ground or earth penetrating member and also as a grappling weed puller. At the upper end there is a ball-like end thrust member 12 provided with a neck 14 fitted telescopically into the upper hollow portion of the tube and pinned or otherwise secured in place as at 16. As shown in phantom lines this ball or head constitutes an appropriate knob which is capable of being pushed upon with the hand (hammered by hand, if desired) in order to press the jaw 8 into the desired weeding position. This knob is susceptible of practical use when the ground is not too hard.

Figure 3:
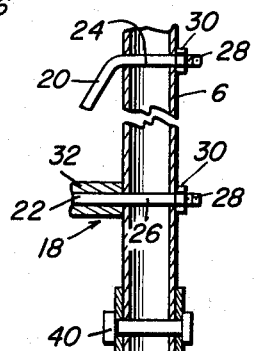
FIGURE 3 is a view with parts in section and elevation taken approximately on the plane of the irregular vertical section line 3—3 of FIG. 2.

When the knob is not found to be workable the jaw 8 can be driven home, so to speak, by the stirrup 18. This stirrup comprises a rod member having a diagonal portion 20 and a generally horizontal portion 22 (see FIG. 3). The respective end portions 24 and 26 are passed through holes provided therefor in the tubular member and the extremities are screw-threaded as at 28 to accommodate assembling and retaining nuts 30. A metal sleeve or the like 32 is provided on the horizontal portion and constitutes a satisfactory footpiece. Consequently the thus constructed stirrup provides an alternatively usable means for driving or forcing the jaw 8 into place in an obvious manner.

The relatively movable jaw, which is denoted generally by the numeral 34, is an integral component or part of the means which is mounted above but proximal to the companion stationary jaw 8. This jaw is made up of end portions 36 of a pair of jaw operating arms the curvate major portions 38 of which straddle the tubular member, are pivoted at diametrically opposite points thereto as denoted at 40.

Figure 2:
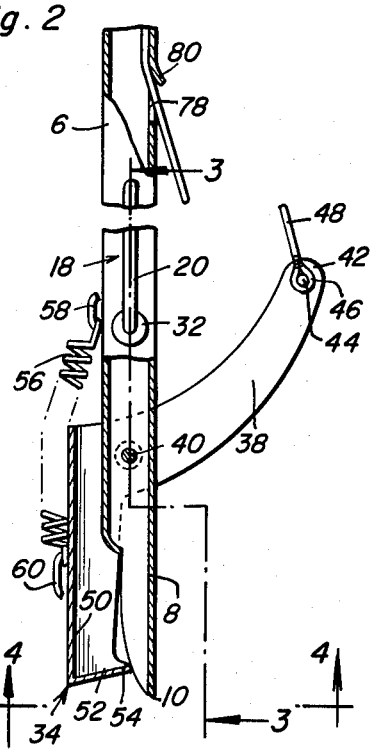
FIGURE 2 is a view with parts in section and elevation and which is based on the openable and closable jaw means at the lower end of the tubular member.
Figure 4:
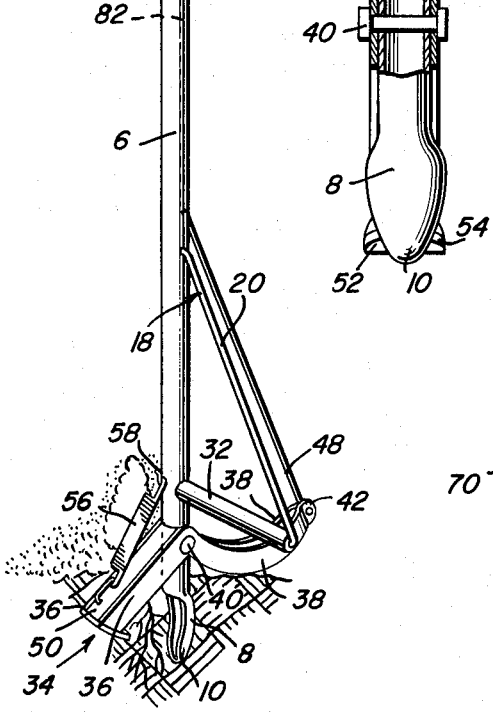
FIGURE 4 is a bottom plan view which, alternatively described, may be regarded as a view taken on the plane of section line 4—4 of FIG. 2.
Figure 5:
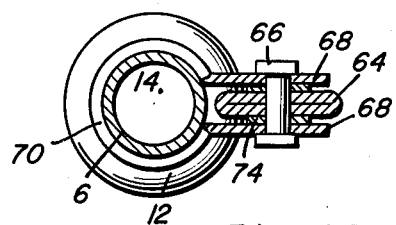
FIGURE 5 is an enlarged view with parts in section and elevation taken on the plane of the section line 5—5 of FIG. 1.

The righthand terminal portions are fashioned into appropriate lugs or ears 42 carrying a pin 44 (see FIG. 2) to which an eye 46 at the lower end of a pull wire 48 is connected. This wire made of stainless steel of requisite strength and conformability. Returning to the jaw 34 it will be evident that it includes an elongated web or plate portion 50 which is fastened between the arm portions 34 and has a laterally bent terminal end 52 which constitutes the movable jaw proper and which has a curved terminal lip portion 54 (see FIG. 4) which conformingly projects into the concave side of the spoon-like tip portion 10, that is when the jaws are together as suggested in FIG. 2. A coil spring 56 is provided and is anchored at one end on a hook 58 fixed on the tubular member and a similar anchoring hook 60 carried by the plate 50 as illustrated in FIG. 2.

The operating lever comprises a rigid tubular member 62 which constitutes an appropriate handgrip and which has a flattened end 64 which is hingedly connected with a pin 66 carried by spaced parallel lugs or ears 68 on a collar-like band 70 surrounding the upper portion 72 of the tubular member. This collar or band is welded or otherwise fixed in place and aided with the washers 74 and pin 66 the flattened end of the lever 62 is properly and operatively mounted. The upper end portion 76 of the aforementioned pull wire 48 is appropriately connected to the intermediate portion of the lever or handgrip 62. The tubular member is provided at longitudinally spaced points with appropriate guide holes for the wire one of which is shown at 78 in FIG. 2. The hole is formed by striking out a tongue as at 80. The median portion of the pull wire is of course slidingly threaded through the bore of the tube or tubular member in the manner denoted by dotted lines as at 32.

It will be evident from FIG. 1, for example, that the coil spring 56 constitutes a return spring and serves to hold the jaw 34 in the open ready-to-use position illustrated in the drawing. It is further evident that this action of the spring plus the action of the wire 48 and arms 38 positions and maintains the lever-type handgrip 62 in the position illustrated in FIG. 1.

Keeping in mind then that the cooperating component parts of the overall implement are in their normal ready-to-function state in FIG. 1, it will be evident that by catching hold of the lever 62 as suggested and then pulling up on it the wire 48 will serve to act on the arms 38 and the jaw means 34 to thus forcibly move the jaw 34 toward and into cooperative association with the relatively stationary blade or jaw 8 the user will be in a position to dig down into the ground in the manner shown, locate said jaw 8 properly and then bring the complemental relatively movable jaw 34 into play whereby to dislodge, grip and pull the weed. When the lever 62 is released the spring means 56 acting on the other associated parts will return the latter to their normal relationship.

It is believed that it will be clear from the preceding description and views of the illustrative, but not restrictive, drawing that the component part 8 is shaped in the manner illustrated to assist in penetrating the ground and in this respect constitutes a blade. On the other hand, it is not intended to uproot the weed which is to be pulled. Instead its secondary purpose is that of a relatively stationary limit stop or stationary jaw for cooperation therewith of the relatively movable jaw 34 whereby the two jaws function to grip the weed just under the surface of the ground prior to pulling the same. To this end, the jaw 34 accomplishes the gripping or grappling step which is necessary to extract the weed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A deep-rooted weed dislodging and pulling implement for hand use comprising a rigid elongated tubular member constituting a cane-like handle and of a length that it can be conveniently and satisfactorily used by a user while standing up and without stooping, said tubular member having a lower end portion terminating in an integral axially projecting spoon-bowl-shaped member constituting a relatively stationary ground penetrating jaw and capable of being manually forced endwise into the ground adjacent the weed which is to be uprooted and extracted, unified movable jaw means embodying, in combination, a pair of like oppositely disposed elongated arms straddling and pivotally mounted on diametrically opposite exterior surfaces of said lower end in a plane above the operating plane of said first-named jaw, said arms having like half-portions situated on and projecting laterally beyond one side of said tubular member and having terminal ends fixedly joined together, said arms also having companion half-portions situated on and projecting laterally beyond one side of said tubular member and having terminal ends fixedly joined together, said arms also having companion half-portions situated on a diametrically opposite side of said tubular member and provided with a pair of integrally attached cooperating plates, one of said plates being located at the outer end of the other plate and disposed laterally thereto and constituting and providing a root gripping weed extracting jaw, said last-named jaw being movable in an arcuate path toward and from the concave side of said ground penetrating jaw and having an arcuately curved terminal tip portion adapted to cooperate with said concave side, a coil spring anchored at one end on a lower end portion of said tubular member and having its other end secured to a median portion of one of the aforementioned plates, a hand-operated lever at the upper portion of said tubular member having one end pivotally joined to said tubular member, said tubular member having longitudinally spaced holes therein, and an actuating wire having an upper end portion connected to a median part of said lever, having a median portion passing through said holes the hollow portion of said tubular member and slidingly associated therewith, and having a lower end portion joined to the fixedly connected ends of the first named half-portions of the aforementioned arms.

2. The structure defined in claim 1 and, in combination, a foot accommodating stirrup comprising a frame embodying angularly related companion portions having free terminal ends joined to said tubular member at vertically spaced points, said frame being disposed in a plane which is at right angles to the plane of said arms, one of said members being disposed at right angles to the lengthwise axis of said tubular member and being provided with and surrounded by a sleeve and constituting a footpiece, said footpiece being located in a plane above the pivot point of the aforementioned arms and also projecting at right angles to the plane of operation of said arms so as not to interfere with the operation and control of said arms, and an enlarged spherical head located at the upper end portion of said tubular member, said head constituting a manually grippable thrust knob provided with a shank fitted telescopically into the upper open end of said member and fixedly secured therein, and also wherein the means for pivotally joining the hand-operated lever to said tubular member comprises a collar which is clampingly mounted on and embraces the tubular member just below the plane of said knob.

References Cited by the Examiner
UNITED STATES PATENTS

| 842,420 | 1/1907 | Petty | 294—50.9 |
| 1,105,684 | 8/1914 | Nuttall | 294—50.9 |
| 1,245,920 | 11/1917 | Hinthorn | 254—132 |
| 2,373,872 | 4/1945 | Couture. | |
| 2,436,500 | 2/1948 | Anderson | 294—50.8 |
| 2,749,088 | 6/1956 | Jennens | 254—132 |
| 2,806,733 | 9/1957 | Hund. | |

WILLIAM FELDMAN, *Primary Examiner.*

MILTON S. MEHR, *Examiner.*

O. M. SIMPSON, *Assistant Examiner.*